(12) United States Patent
Pan (10) Patent No.: US 7,597,991 B2
(45) Date of Patent: Oct. 6, 2009

(54) FLEX BASED FUEL CELL

(75) Inventor: Alfred I-Tsung Pan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 949 days.

(21) Appl. No.: 10/618,171

(22) Filed: Jul. 10, 2003

(65) Prior Publication Data

US 2004/0013930 A1    Jan. 22, 2004

Related U.S. Application Data

(62) Division of application No. 09/866,663, filed on May 30, 2001, now Pat. No. 6,620,542.

(51) Int. Cl.
*H01M 8/02* (2006.01)
(52) U.S. Cl. .......................... 429/41; 429/40
(58) Field of Classification Search .......... None
See application file for complete search history.

(56) References Cited

U.S. PATENT DOCUMENTS

| | | | | |
|---|---|---|---|---|
| 5,631,099 | A * | 5/1997 | Hockaday | 429/30 |
| 5,981,097 | A * | 11/1999 | Rajendran | 429/33 |
| 6,007,932 | A | 12/1999 | Steyn | |
| 6,197,145 | B1 * | 3/2001 | Todd et al. | 156/245 |

FOREIGN PATENT DOCUMENTS

| | | |
|---|---|---|
| EP | 0629015 | 12/1994 |
| WO | WO0024073 | 4/2000 |
| WO | WO0259998 | 1/2002 |

\* cited by examiner

*Primary Examiner*—John S Maples (57) ABSTRACT

A fuel cell uses porous metal layers attached on a flex substrate for delivery of liquid fuel to the active catalytic areas on the anodic side. The flex substrate may form an enclosed package such that the liquid fuel can be contained in the enclosed volume and the air can freely exchange with the cathode side of the fuel cell without the need of microchannels and plumbing for mass transporting both fuel and oxygen to the active catalytic area. The porous metal provides a large surface are for the catalytic reaction to occur.

8 Claims, 8 Drawing Sheets

FLEX BASED FUEL CELL

RELATED APPLICATIONS

The present application is a divisional of, and claims priority from U.S. application Ser. No. 09/866,663, by Alfred I-Tsugn Pan., entitled: "Flex Based Fuel Cell," filed May 30, 2001, now U.S. Pat. No. 6,620,542, which is incorporated herein by reference in its entirety.

TECHNICAL FIELD

The technical field is fuel cells, with our without proton exchange membranes.

BACKGROUND

A fuel cell is an electrochemical apparatus wherein chemical energy generated from a combination of a fuel with an oxidant is converted to electric energy in the presence of a catalyst. The fuel is fed to an anode, which has a negative polarity, and the oxidant is fed to a cathode, which, conversely, has a positive polarity. The two electrodes are connected within the fuel cell by an electrolyte to transmit protons from the anode to the cathode. The electrolyte can be an acidic or an alkaline solution, or a solid polymer ion-exchange membrane characterized by a high ionic conductivity. The solid polymer electrolyte is often referred to as a proton exchange membrane (PEM).

In fuel cells employing liquid fuel, such as methanol, and an oxygen-containing oxidant, such as air or pure oxygen, the methanol is oxidized at an anode catalyst layer to produce protons and carbon dioxide. The protons migrate through the PEM from the anode to the cathode. At a cathode catalyst layer, oxygen reacts with the protons to form water. The anode and cathode reactions in this type of direct methanol fuel cell are shown in the following equations:

Anode reaction: $CH_3OH+H_2O \rightarrow 6H^+ +CO_2 +6e^-$

Cathode reaction: $3/2\ O_2 +6H^+ +6e^- \rightarrow 3H_2O$

Figure 1:
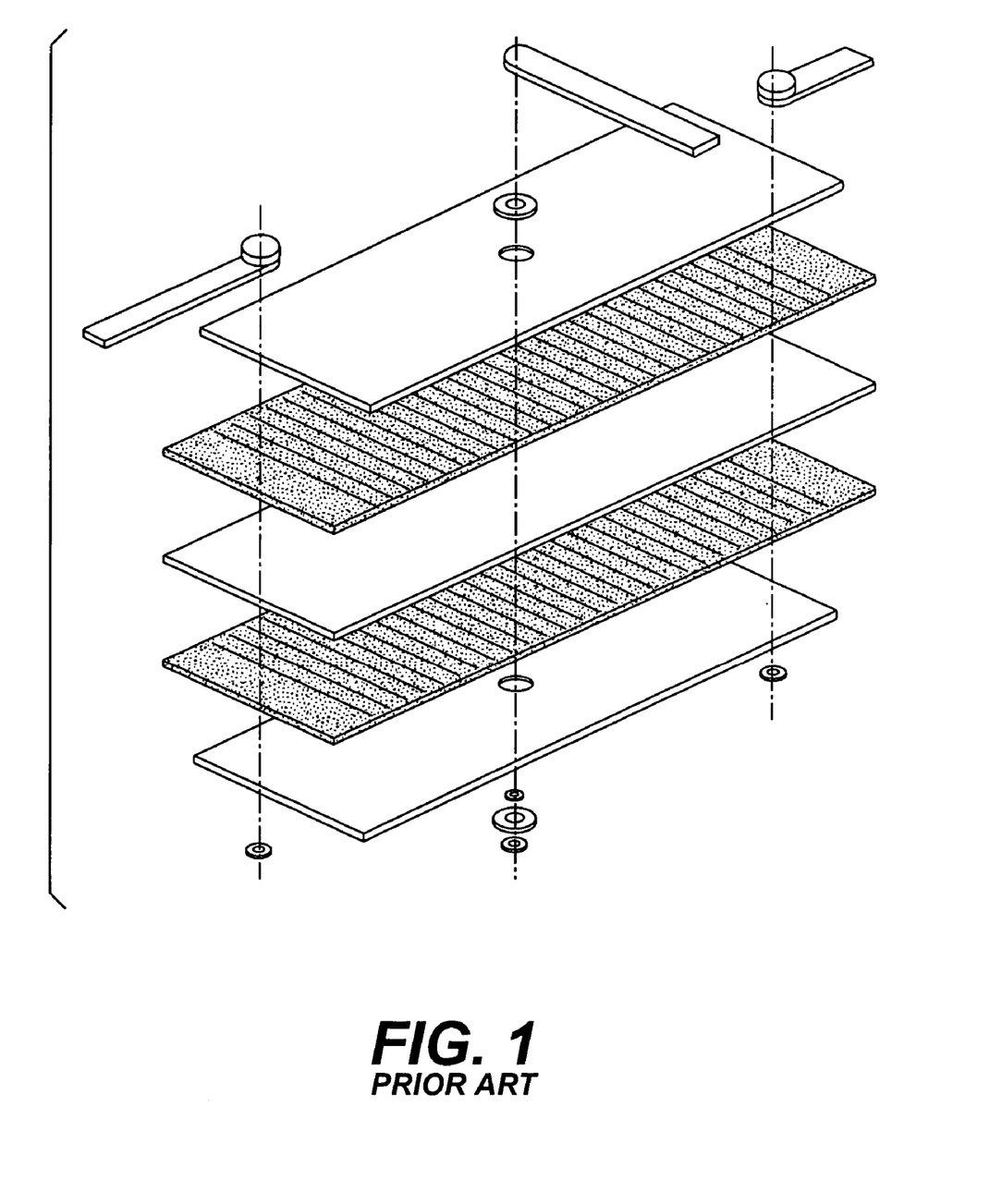
FIG. 1 illustrates a prior art fuel cell assembly.

The essential requirements of typical fuel cells (see, e.g., FIG. 1) include: first, the fuel cell requires efficient delivery of fuel and air to the electrode, which typically requires complicated microchannels and plumbing structures. A second requirement is that the fuel cell should provide easy access to the catalyst and a large surface area for reaction. This second requirement can be satisfied by using an electrode made of an electrically conductive porous substrate that renders the electrode permeable to fluid reactants and products in the fuel cell. To increase the surface area for reaction, the catalyst can also be filled into or deposited onto a porous substrate. However, these modifications result in a fragile porous electrode that may need additional mechanical support, such as by use of a fiber matrix. Alternatively, the electrode can be made of an etched porous Vycor glass substrate or an etched-nuclear-particle-track membrane substrate to improve its toughness and strength. A third requirement is close contact between the electrode, the catalyst, and the PEM. The interface between the electrode and PEM is a discontinuity area as concerns the electric current transmission wherein the charge carriers are the electrons, on one side, and the protons on the other side. A solution to this problem has been attempted by hot pressing of the electrodes onto the PEM (U.S. Pat. No. 3,134,697). Another solution suggests the intimate contact of the catalytic particles with a protonic conductor before interfacing the electrode with the electrolyte (U.S. Pat. No. 4,876,115). Other solutions are described in U.S. Pat. Nos. 5,482,792 and 6,022,634. A fourth requirement is that the fuel cell should provide for humidity control of the electrode. The PEM requires water to be effective in conducting protons. However, since it operates at a higher temperature than its surroundings, the PEM tends to dehydrate during operation. The typical method of re-hydrating the PEM is to capture water in the exhaust stream and circulate it back to the PEM.

SUMMARY

A flex based fuel cell comprises two flex circuits assembled face-to-face with PEM layers in between. Each flex circuit includes layers of a flex substrate, a patterned conductive material, a porous material sheet with a catalyst coating, and a PEM.

The catalyst coating on the porous material provides a large surface area for chemical reactions to proceed and small gaps in the porous material deliver liquid fuel to the catalyst through capillary force. The support of a soggy PEM on a porous electrode may be achieved by assembling two flex substrates face-to-face with the PEM constrained between the two flex substrates.

The flex substrates can bend in such a fashion to form a closed structure for confining the fuel. The delivery of the fuel can then be achieved by capillary force of a porous material sheet with the fuel distributed uniformly to all active surfaces, as long as a portion of the porous material sheet is in contact with the liquid fuel. Microchannels and plumbing are not required.

The flex based fuel cell can confine water between the two flex substrates to provide moisture for the PEM. Since deionized water can easily conduct protons, but not electrons, a fuel cell can be constructed without the PEM. Two flex substrates without the PEM layer can be bonded together face-to-face with an adhesive layer in between as ridges.

The flex substrate, such as one using Kapton, provides additional advantages. The electrodes can be patterned directly on the flex substrate, thereby connecting different fuel cell panels in either serial or parallel manner.

In an embodiment, the flex substrates are formed into a cylinder. The interior side of the cylinder would be the fuel side, and the exterior of the cylinder would be the oxygen side. The fuel cell can be sealed at the bottom of the cylinder to provide a container for the liquid fuel. The liquid fuel, such as methanol, is delivered by the porous metal to the active catalytic surface of the interior side. Protons generated in the cylinder interior then diffuse through the PEM and reach the catalytic surface on the exterior side of the cylinder, where the protons combine with oxygen. The exterior side of the fuel cell is open to the atmosphere, which serves to supply the oxygen to the cylinder and carry away the reactant water vapor.

The flex substrates can be manufactured by the following steps:

(1) Patterning the flex substrate, such as Kapton (Dupont) or Upilex (Ube), with a thin film of conductive material. The patterning of the thin film provides the flexibility to define the size of fuel cell panels, as well as to configure the fuel cell for any particular current density or voltage output by routing the thin film patterning appropriately.

(2) Attaching a porous material sheet to the patterned thin film on the flex. In an embodiment, the porous material may be a porous metal. Alternatively, other porous materials may be used. For example, an organo-metallic sol-gel material may be attached to the patterned thin film.

The attachment step can be accomplished by either attaching a commercially available porous metal sheet on the flex, or sintering a thick layer of porous metal on the flex. A thick porous metal layer can also be manufactured by applying a paste of low temperature metal powder, such as zinc nano particles (Aldrich catalog # 48,393-1) mixed in glycol, and baking the resulting assembly in an oven to dry out the glycol and partially melt the metal particles. The metal powder paste can be screen printed on the flex substrate so that the location and shape of the sintered porous metal can conform to the thin film electrode previously patterned on the flex substrate. As an alternative to the zinc powdered metal, silver powder may be used.

(3) Depositing a catalytic coating on the porous material sheet. Several catalytic materials, such as Pt—Ru and Pt—Ru—Os, are effective in converting methanol to proton without poisoning platinum in the flex substrate.

(4) Ablating backside openings to allow access to the catalytic surfaces. The flex substrate is ablated with a laser from the backside to create openings so that fuel on the cathode side and oxygen on the anode side can reach the active catalytic surfaces through the openings and the porous metal layer.

(5) For those flex substrates with a PEM, the surface of the catalytic coating may then be coated with a thin layer of PEM by dipping the structure into a 5% Nafion solution. A thin layer of PEM on top of the catalyst surface helps to capture protons. The thickness of the PEM may be controlled so that the liquid fuel can readily diffuse through the thin layer.

Two flex substrates can then be assembled face-to-face with the PEM in between to form a flex based fuel cell. For fuel cells without the PEM, two flex circuits manufactured with only the first four steps (without the PEM coating step) are assembled face-to-face with the catalytic coating layer in between.

DESCRIPTION OF THE DRAWINGS

The detailed description will refer to the following drawings, in which like numerals refer to like elements, and in which:

FIG. 2 shows a cross section of a flex based fuel cell having two flex circuits assembled face-to-face with a proton exchange membrane PEM in between;

DETAILED DESCRIPTION

Figure 2:
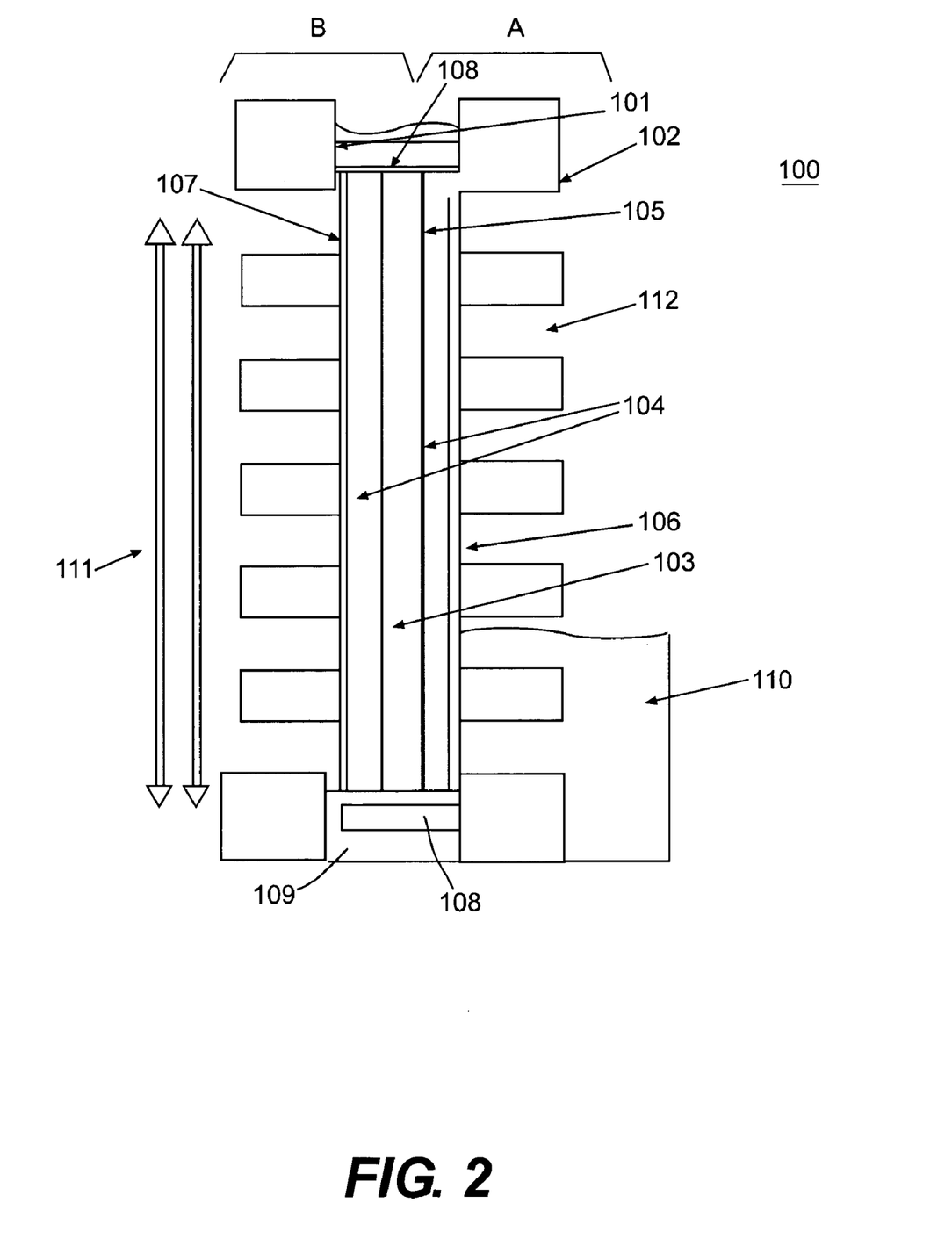

FIG. 2 is a simplified cross-section view showing an exemplary flex based fuel cell 100. The fuel cell 100 includes a right flex circuit A and a left flex circuit B. This naming convention is purely arbitrary and is used to add greater clarity to the description of the flex based fuel cell 100. Two flex substrates 101 and 102 are assembled face-to-face together with a PEM 103 in between. On either side of the PEM 103 are porous material and catalyst layers 104. Adjacent to the PEM 103 is a palladium (Pd) layer 105 that prevents cross-over of the methanol fuel. Adjacent to the porous material and catalyst layers 104 are anode and cathode electrodes (conductors) 106 and 107. A dry film adhesive 108 serves to separate portions of the fuel cell 100. Recycled water 109 flows through the fuel cell 100, as shown. A liquid fuel 110, such as methanol, for example, is provided on the anode side of the fuel cell 100. Air and water vapor 111 flow past the cathode electrode 107. The methanol fuel 110 has direct contact with the porous material layers 104 through openings 112 in flex substrates 101, 102. The methanol fuel 110 is delivered by the porous material layers 104 to an active catalytic surface 105 where $CH_3OH$ reacts with $H_2O$ (methanol) to form $CO_2$ and protons. The protons then diffuse through the PEM layer 103 and reach the cathode 107, where the protons combine with oxygen to form $H_2O$. The left flex circuit B of the fuel cell 100 is open to the atmosphere, which serves to supply the oxygen to the fuel cell, and carry away the reactant water vapor 111.

In an embodiment, the porous material layers 104 are formed of a porous metal material such as zinc or silver powder. The porous metal layers 104 deliver the liquid fuel (methanol) 110 by means of capillary action. Capillary action depends on the fact that a liquid near a solid wall will undergo curvature of the liquid surface. The amount of curvature depends on the difference between surface tension of the solid-vapor film ($S_{LV}$) and surface tension of the solid-liquid film ($S_{jv}$). Depending on the liquid and the solid, the curvature can be positive, negative or zero. In the case of a liquid such as methanol that wets the pores in the porous metal layer 104, the methanol will rise in the pores until an equilibrium height y is reached:

$$y = \frac{2S_{LV}\cos\theta}{\rho g r}$$

where:

r=radius of pores

θ=contact angle of the liquid methanol the pores.

Thus, by careful design, the liquid fuel (methanol) 110 can be made to supply all portions of the fuel cell 100 without elaborate pumps and plumbing. Note that pores in the porous metal layer 104 may be oriented in the local plane, or substantially in the local plane defined by the flexible substrates 101, 102. The pores may be further oriented such that liquid fuel will be transported in a specified direction (e.g. vertically) within the porous metal layer 104 so that liquid fuel reaches all, or substantially all, of the fuel side flex circuit A (see FIG. 2).

Figure 3A:
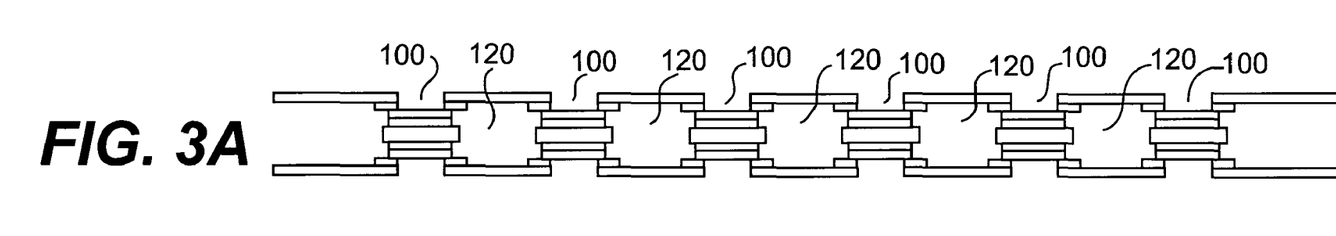
FIGS. 3A and 3B show a top sectional view and a plan view of the fuel cell assembly.
Figure 3B:
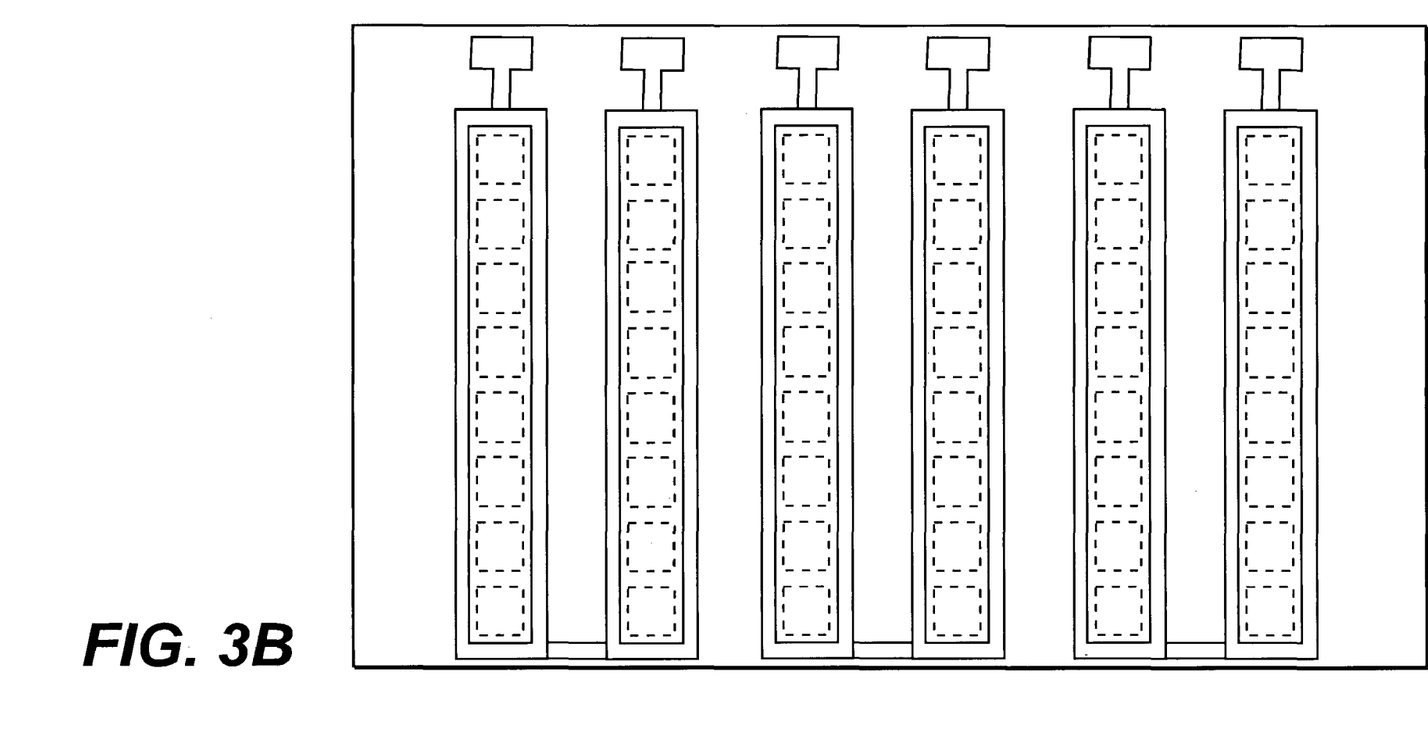

As shown in FIGS. 3A and 3B, two or more fuel cells 100 can be bonded together in such a way that there is an enclosed space 120 between two fuel cells 100. The enclosed space 120 is filled with water or a water containing solution to provide moisture for the PEMs, which require water to be effective in conducting protons.

Figure 4:
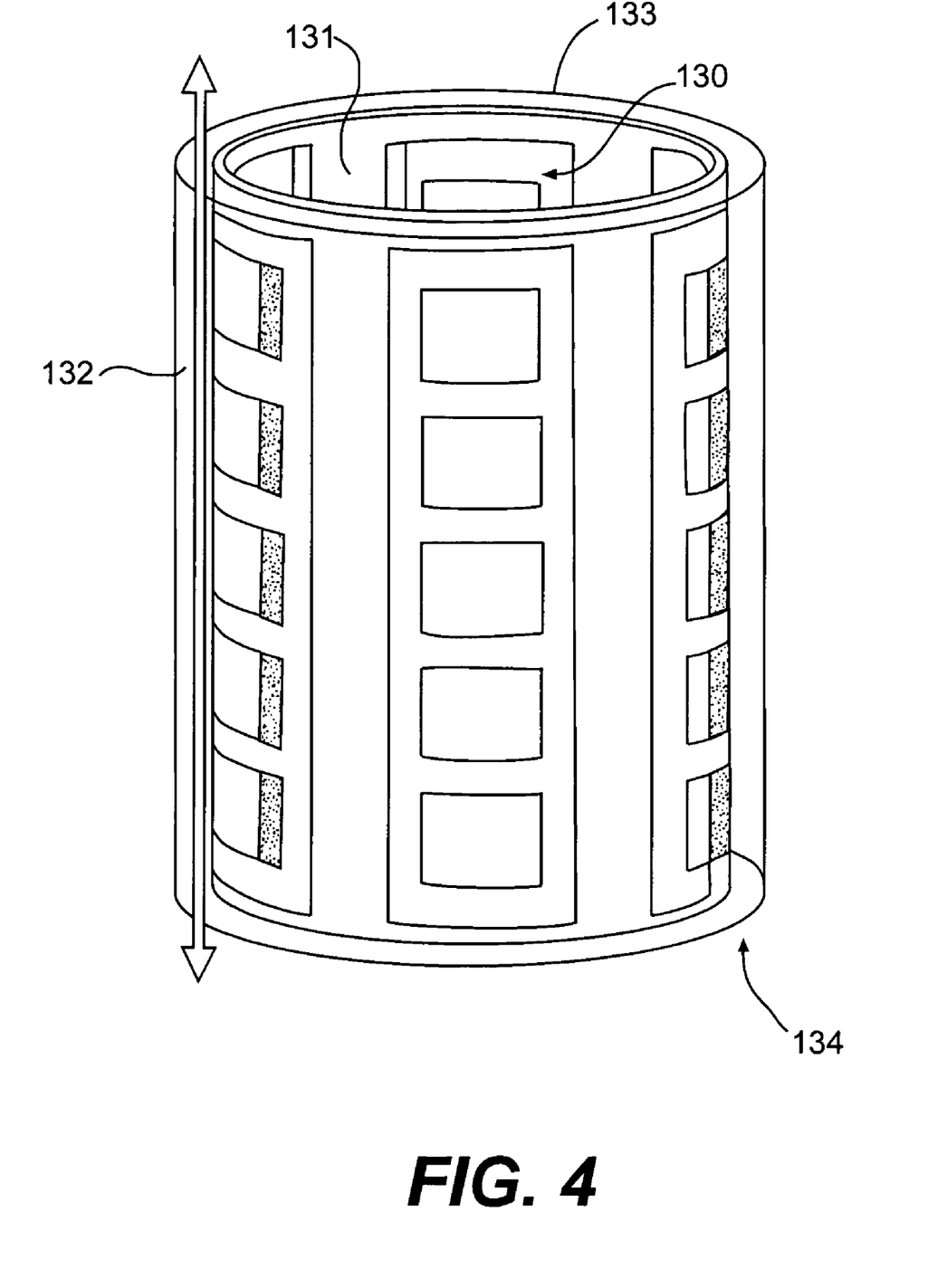
FIG. 4 shows a flex based cylindrical fuel cell assembly.

As shown in FIG. 4, a flex fuel cell assembly 130 can be shaped into the form of a cylinder. An interior 131 of the cylinder would be the fuel side, and an exterior 132 of the cylinder would be the oxygen side. The fuel cell can be sealed at a top 133 and a bottom 134 of the cylinder interior 131 to provide a container for the liquid fuel. Alternatively, the cylinder top may be left unsealed. In an additional embodiment, liquid fuel may be supplied to the exterior 132 of the flex fuel cell assembly 130.

In addition to the non-planar cylindrical shape shown in FIG. 4, the flex fuel cell assembly 130 may be shaped into other non-planar and substantially non-planar shapes, including a polygon of N sides, a star having M points, where M may be the integer 5 or larger, and an oval, for example. The flex fuel cell assembly 130 may also be formed in a shape of a cross or other non-planar or substantially non-planar form. These complex shapes have the advantage of increasing the surface area for fuel cell reactions and power production.

Because the flex fuel cell assembly 130 can be molded to a variety of shapes, the flex fuel cell assembly 130 is ideal for power applications that are constrained in size and shape. Thus, a fuel cell system using the flex fuel cell assembly 130 can be shaped to fit virtually any container or enclosure, allowing the fuel cell system to be used in a wide variety of applications where prior art fuel cell systems would not be useable.

Wrapping a flex substrate into the cylindrical shape as shown in FIG. 4 has the added advantage of enhancing the adhesive effect between the Nafion and the flex substrates. The enhanced adhesive effect occurs primarily because of the compressive forces acting on the Nafion by the cylindrical flex substrates.

As noted above, the flex-based fuel cell 100 shown in FIG. 2, as well as other embodiments, such as the cylindrical fuel cell 130 shown in FIG. 4, may use capillary action to draw liquid fuel, such as methanol, to all active regions of the fuel cell. The rate of capillary action may be controlled by adjusting the pore size (diameter) of pores in the porous metal and catalytic layers 104. Using capillary action to move the liquid fuel through the fuel cell 100 allows the fuel cell 100 to operate without expensive and bulky pumps, valves and piping, thereby making the fuel cell lighter and more desirable for portable power applications.

Figure 5A:
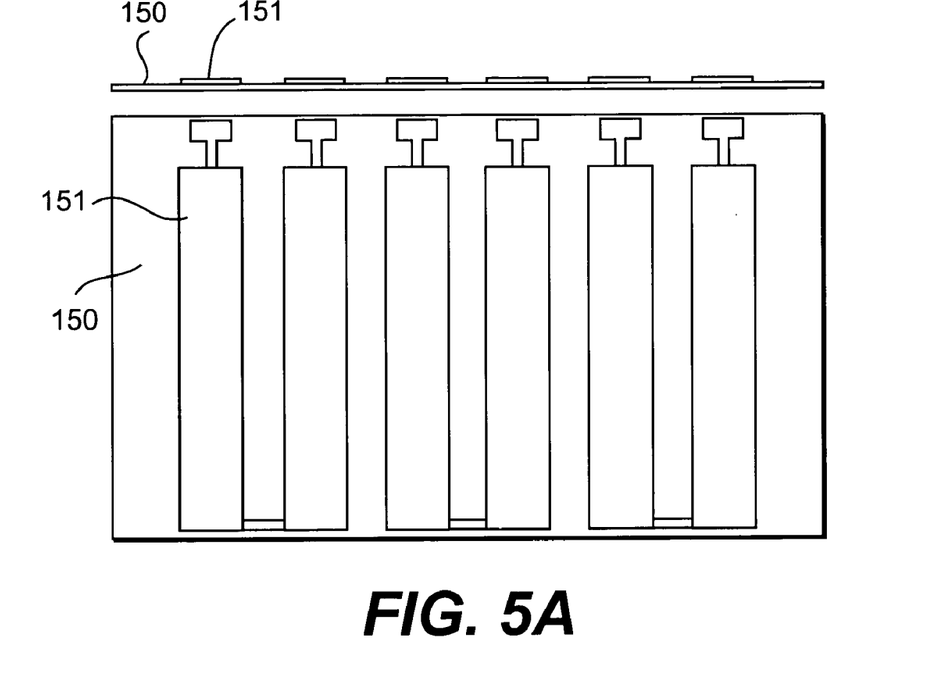
FIGS. 5A-5E show a process for manufacturing the flex based fuel cell.
Figure 5B:
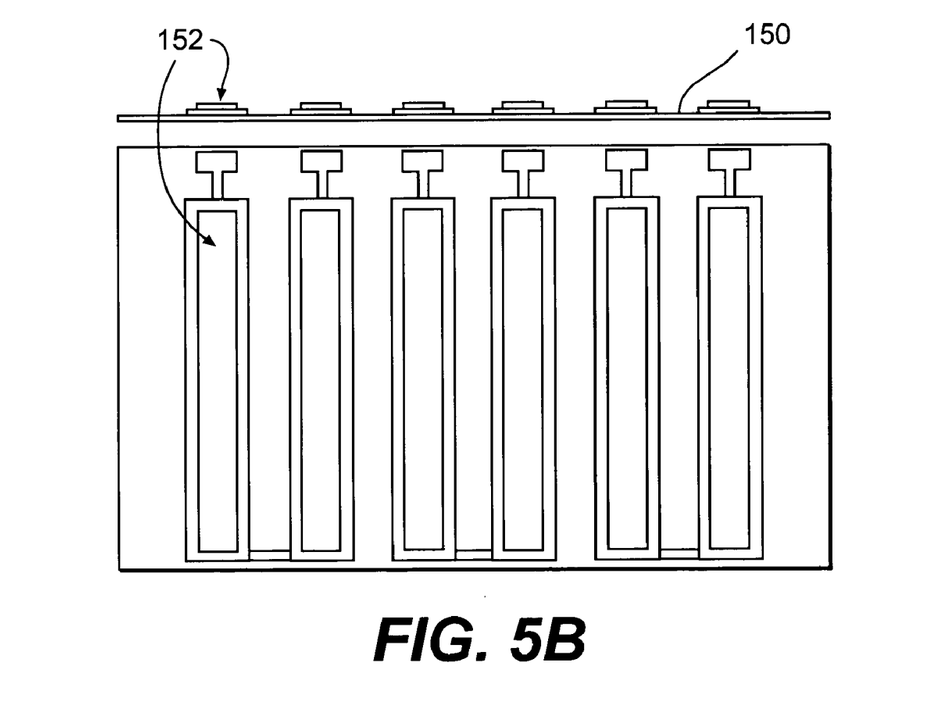

FIGS. 5A-5E depict processing steps for manufacturing the flex circuits. As shown in FIG. 5A, which includes a plan view and a side view, the first step is to metallize a flex substrate 150, using a material such as Kapton or Upilex, to form a thin film electrode 151 in a predetermined pattern. The patterning of the thin film electrode 151 defines the size of the cell panels, and configures the fuel cell for any particular current density or voltage output. The next step, as shown in FIG. 5B (which includes plan and side views), is to attach a porous metal layer 152 to the patterned thin film electrode 151 on the flex substrate 150. The porous metal layer 152 can be a commercially available porous metal sheet. Alternatively, a thick porous metal layer can be sintered on the flex. Referring to FIG. 5B, a paste of low temperature metal powder such as zinc nano particles mixed in glycol, is applied on top of the thin film electrodes 151. Alternatively, silver powder may be used. The flex substrate 150 is then baked in an oven to dry out the glycol and partially melt the metal particles to form a thick layer of porous metal. The metal powder paste also may be screen printed on the flex substrate 150 so that the location and shape of the sintered porous metal can conform to the thin film electrode 151 previously patterned on the flex substrate 150.

Figure 5C:
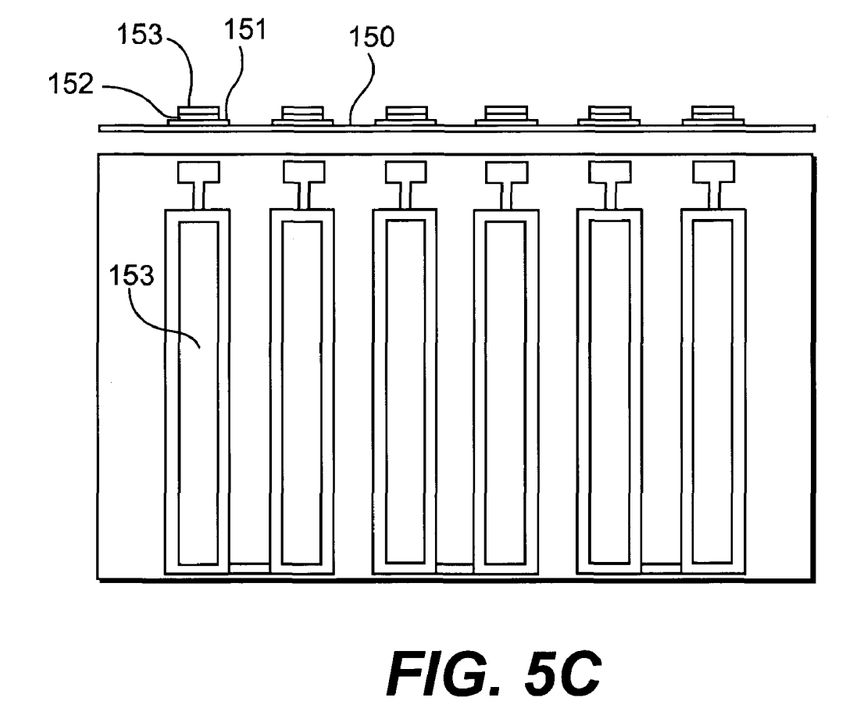

The next step, as shown in FIG. 5C (including plan and side views), is to deposit a layer 153 of catalytic coating on the porous metal layer 152. Referring to the composition of catalytic coating for fuel cells using methanol, catalytic materials such as Pt—Ru and Pt—Ru—Os, are found to be effective in converting methanol to protons without poisoning other fuel cell constituents.

Figure 5D:
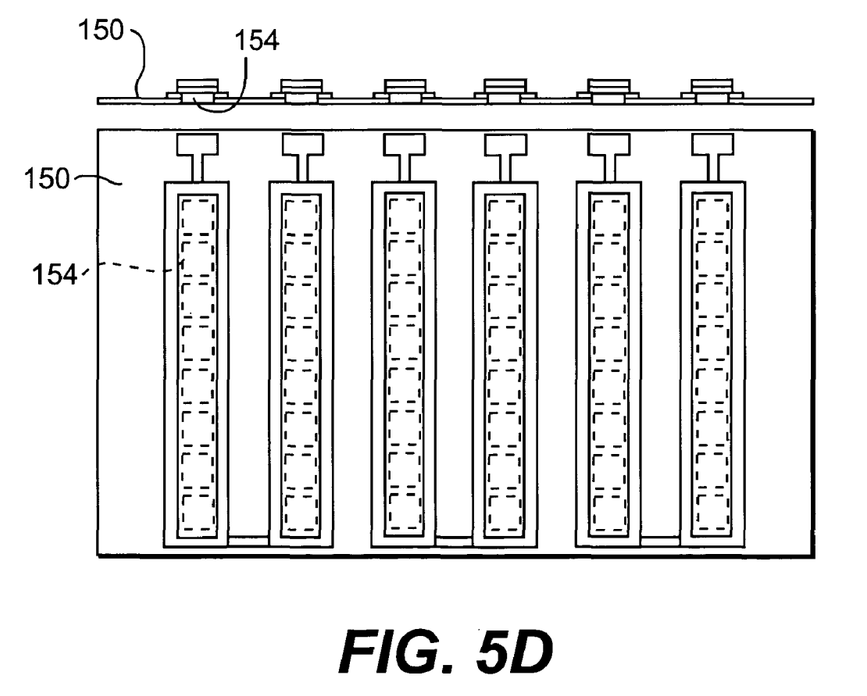

The next step, as shown in FIG. 5D (again showing plan and side views), is to laser ablate backside openings 154 on the flex substrate 150 and the thin film electrodes 151, so that the fuel or oxygen can reach the active catalytic layer 153 through openings in the flex substrate 150 and the porous metal layer 152.

Figure 5E:
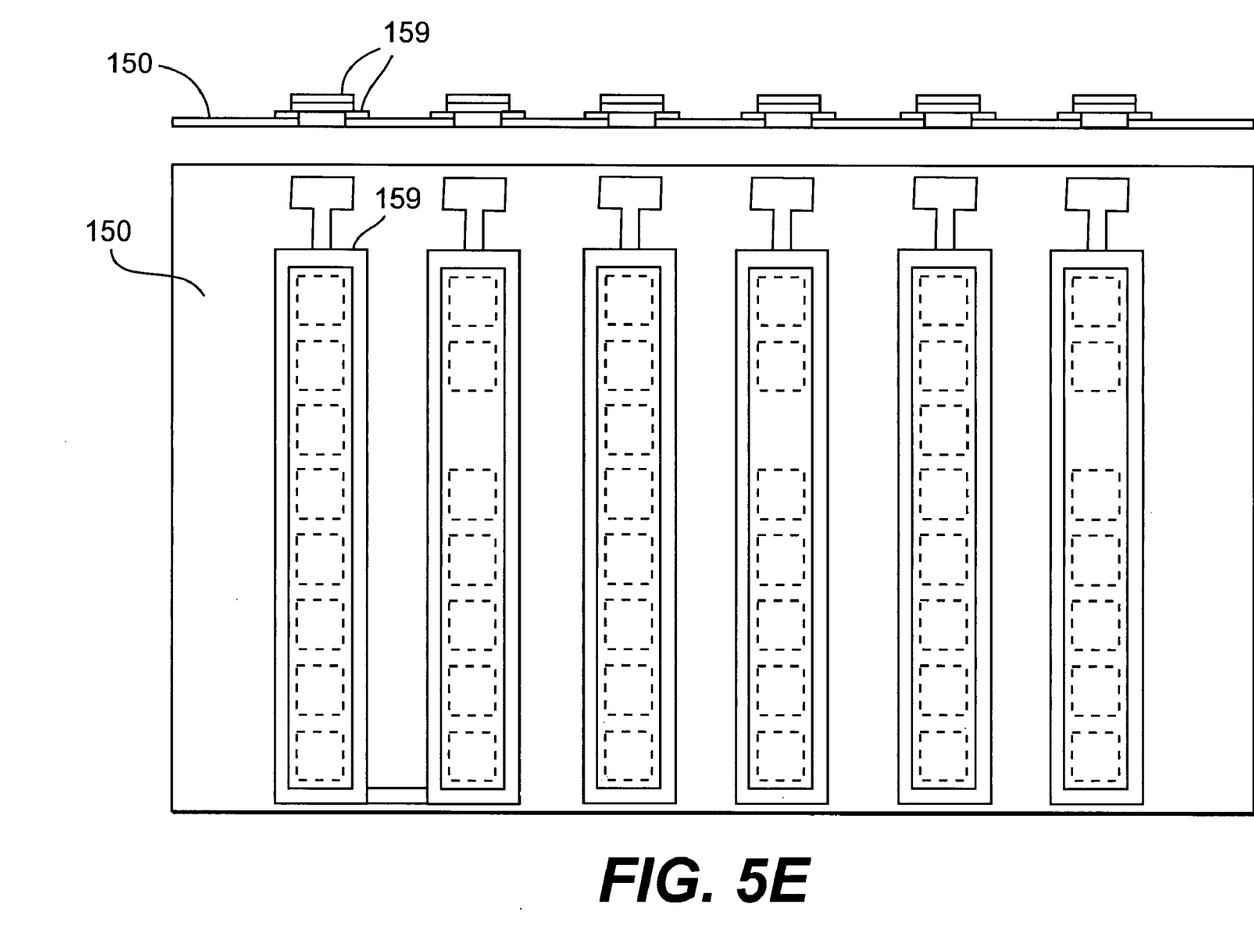

The final step, as shown in FIG. 5E (plan and side views), is to cover the surface of the catalytic layer 153 with a thin layer of PEM 159. In a preferred embodiment, the flex structure is dipped into a 5% Nafion solution. A thickness of the PEM 159 should also be controlled so that the liquid fuel can diffuse through this thin layer.

Figure 6:
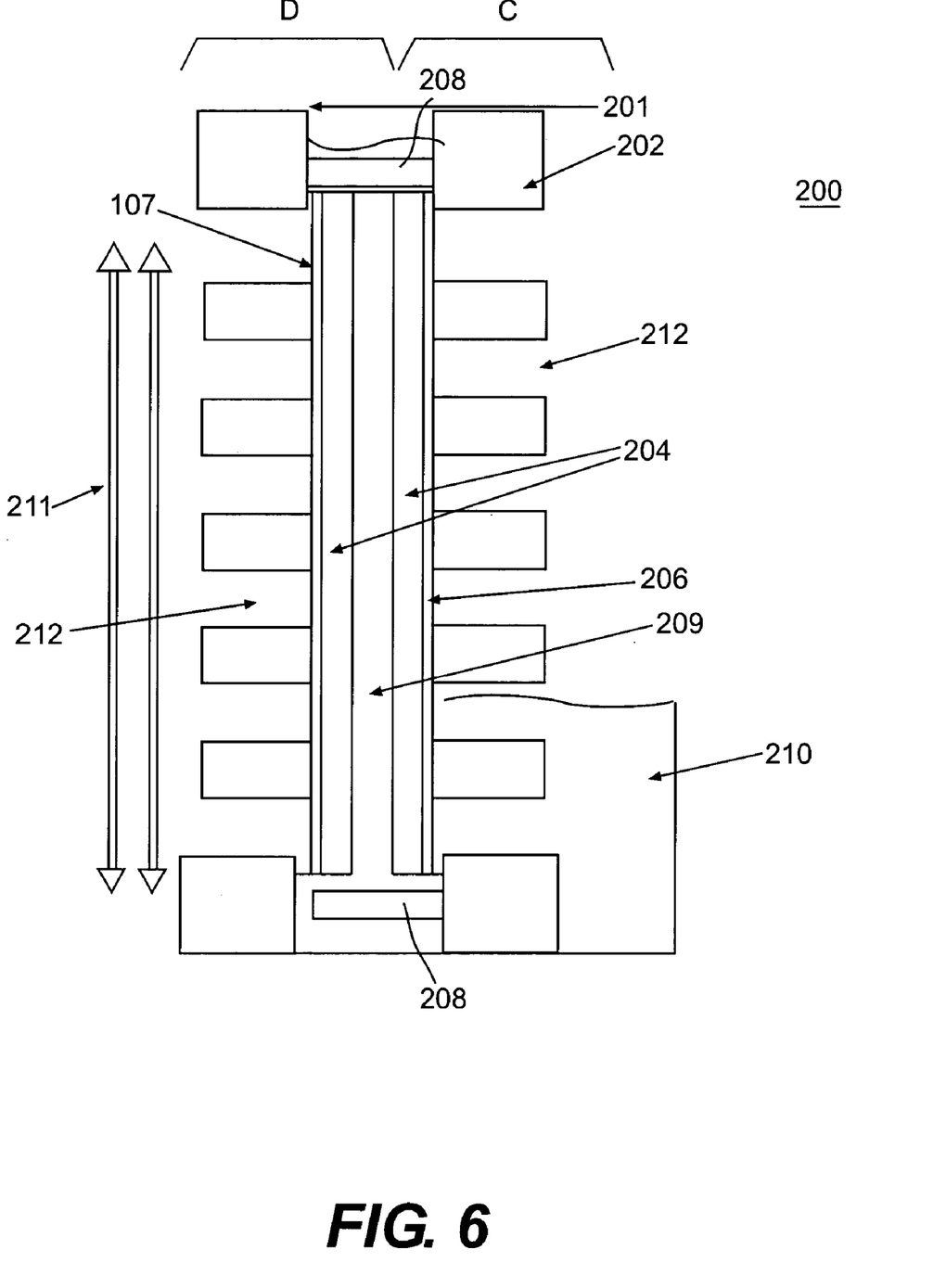
FIG. 6 shows an alternative flex based fuel cell.

FIG. 6 illustrates an alternative embodiment of a flex circuit for use in a flex based fuel cell. The flex based fuel cell includes a plurality of flex circuits. A flex circuit 200 includes a right, or fuel-side flex circuit C and a left, or air-side flex circuit D. This naming convention is purely arbitrary and is used to add greater clarity to the description of the flex circuit 200.

The flex circuit 200 includes flex substrates 201 and 202, each having openings 212. In immediate contact with the flex substrates 201 and 202 are conductors 206 and 207. Adjacent the conductors 206, 207 are porous metal and catalyst layers 204. In an embodiment, the catalyst may be Pt—Ru or Pt—Ru—Os. The porous metal may be chosen so that the pores in the porous metal provide a capillary action that draws fuel into the flex circuit 200. An adhesive 208 may be used to seal the space between the porous metal and catalyst layers 204.

A liquid fuel 210, such as methanol, is supplied at the right side C of the flex circuit 200. Air and water 211 are removed at the left side D of the flex circuit 200.

In a departure from other fuel cell designs, the flex circuit 200 does not use a PEM. Instead, a thin layer 209 of de-ionized water is maintained between the porous metal and catalyst layers 204. By maintaining a spacing between the porous metal and catalyst layers 204, the flex circuit 200 is able to generate protons from the liquid fuel 210 and the protons are combined with oxygen to form water. That is, the de-ionized water conducts protons but does not conduct electrons. Thus, by eliminating the PEM, the flex circuit 200 shown in FIG. 6 is less costly to build.

Although preferred embodiments and their advantages have been described in detail, various changes, substitutions and alterations can be made herein without departing from the spirit and scope of the flex based fuel cell as defined by the appended claims and their equivalents.

The invention claimed is:

1. A flex-based fuel cell, comprising:
   a first flexible circuit; comprising:
      a first flexible substrate, and
      a porous layer, wherein the porous layer comprises a plurality of pores oriented to distribute fuel to a catalyst using a capillary action; and
   a second flexible circuit adjacent the first flexible substrate circuit, wherein the first and the second flexible circuits are conformable to a substantially non-planar shape, and wherein the first and the second flexible circuits form a channel between the first and second flexible circuits containing deionized water.

2. The flex-based fuel cell of claim 1, further comprising a proton exchange membrane between said first and second flexible circuits.

3. The flex-based fuel cell of claim 1, wherein the substantially non-planar shape comprises a cylinder.

4. The flex-based fuel cell of claim 3, wherein an interior of the cylindrical flex-based fuel cell contains liquid fuel.

5. The flex-based fuel cell of claim 4, wherein the liquid fuel is methanol.

6. The flex-based fuel cell of claim 1, further comprising a dry film adhesive disposed between the first flexible substrate and a second flexible substrate which is part of the second flexible circuit.

7. The flex-based fuel cell of claim 1, wherein said porous layer comprises metal.

8. The flex-based fuel cell of claim 1, wherein said catalyst is disposed on said porous layer.

* * * * *